United States Patent [19]

Niklaus

[11] 4,109,529
[45] Aug. 29, 1978

[54] SERVO ARRANGEMENT
[75] Inventor: Bernd Niklaus, Rastatt, Fed. Rep. of Germany
[73] Assignee: Robert Bosch GmbH, Stuttgart, Fed. Rep. of Germany
[21] Appl. No.: 820,130
[22] Filed: Jul. 29, 1977
[30] Foreign Application Priority Data
Aug. 31, 1976 [DE] Fed. Rep. of Germany ....... 2637213
[51] Int. Cl.$^2$ ...................... F16H 35/00; G05G 1/14; F16D 65/14; F16D 11/06
[52] U.S. Cl. .................................. 74/388 R; 74/512; 188/106 R; 192/415
[58] Field of Search ............................ 74/388 R, 512; 192/41 S, 47; 188/106 R

[56] References Cited
U.S. PATENT DOCUMENTS
| 3,116,815 | 1/1964 | Chapman, Jr. | 188/106 R |
| 3,125,889 | 3/1964 | Perryman | 74/388 R X |
| 3,643,524 | 2/1972 | Herring | 74/512 |

Primary Examiner—Leonard H. Gerin
Attorney, Agent, or Firm—Michael J. Striker

[57] ABSTRACT

A servo arrangement, especially for brake force amplifiers for automotive vehicles, in which a servomotor provides an auxiliary moment which is transmitted by a coil spring coupling to a linkage. The coil spring has a hook-shaped rear end adapted to be engaged by a first entrainment member connected to a power take-off means of the arrangement so as to tighten the coil spring about the peripheral surface of a cylinder driven by the servomotor and the front end of the coil spring, at which the first coil of the spring is outwardly bent in form of a spiral, is adapted to be engaged by a second entrainment member connected to operator controlled force applying means to expand the coil spring so that the latter may slip on the peripheral surface of the cylinder.

14 Claims, 4 Drawing Figures

SERVO ARRANGEMENT

BACKGROUND OF THE INVENTION

The present invention relates to a servo arrangement, especially for brake force amplifiers for automotive vehicles with a power take-off means and drive means, preferably operated by muscle power, and connected with the power take-off means by elastically deformable connecting means, in which an auxiliary moment provided by a servomotor is transmitted over a coil spring coupling to the power take-off means by means of a coil spring coupling in dependence on the deformation of the elastically deformable connecting means.

In a known servo arrangement of this kind, the coil spring coupling is constituted by coil spring in which, in order to render the coupling active, the coil spring is expanded. While this construction operates satisfactorily, it is relatively large and complicated. This may render, especially when the servo arrangement is to be used in automotive vehicles as brake force amplifiers, the known construction unsuitable for use.

SUMMARY OF THE INVENTION

It is an object of the present invention to provide a servo arrangement of the aforementioned kind which is compacter than the above-mentioned servo arrangement known in the art and which can also be more easily serviced.

With these and other objects in view, which will become apparent as the description proceeds, the servo arrangement according to the present invention, to be used especially for brake force amplifiers of automotive vehicles, mainly comprises cylinder means mounted for rotation about its axis and adapted to be driven by a servo motor in one direction about its axis, power take-off means, operator controlled force applying means, elastically deformable means connecting said operator controlled force applying means to said power take-off means, coupling means for transmitting the moment applied to said cylinder means by the servomotor to said power take-off means, and comprising a multicoil spring wound about the cylinder means and having a hook-shaped end which, as considered in the direction of rotation of the cylinder means constitute the rear end of the coil spring and an opposite end portion constituted by at least a first quarter of the first winding of the coil spring extending in spiral form radially outwardly, and means for rendering the coupling means active and inactive in dependence on the elastic deformation of the deformable means and comprising a first entrainment member connected to the power take-off means and adapted to engage the hook-shaped rear end of the coil spring to apply a tension force to the latter to tightly engage the peripheral surface of the rotating cylinder means, and a second entrainment member connected to the operator controlled force applying means and adapted to engage the front end portion of the coil spring tending thereby to bend the latter outwardly so that the coil spring may slip on the peripheral surface of the cylinder means.

The power take-off means and the operator controlled force applying means preferably comprise two levers extending parallel and closely adjacent each other and each mounted in the region of one end thereof turnable about the axis of the cylinder means and respectively carrying the first and second entrainment members extending parallel to the axis of the cylinder means. This construction facilitates the mounting of the servo arrangement, when used as the brake force amplifier for automotive vehicles, into the foot space of such vehicles in which the brake pedal and the linkage leading to the main brake cylinder are also arranged directly adjacent each other. Since the coil spring serving as a coupling is, when the coupling is rendered active, contracted about the circumference of the cylinder this coil spring may be manufactured simpler and at lesser cost, especially be wound from flat wire, than coil spring couplings according to the prior art, which are rendered active by expanding the same against the inner surface of a hollow cylinder. Grinding operations on the finished wound contracting coil spring, as are necessary by expanding coil spring couplings, become unnecessary.

Furthermore, by the specially formed first winding of the coil spring, which abuts with an acute angle onto the entrainment member cooperating therewith, the transition region in which the coil spring may slip on the peripheral surface of the cylinder, is enlarged. This essentially improves the desired proportionality between the introduced auxiliary moment and the force applied by the operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 2:
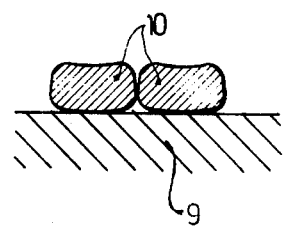
FIG. 2 illustrates part of the coil spring encircled by the dash-dot line of FIG. 1 on an enlarged scale.

The servo arrangement illustrated in the drawing is used as brake force amplifier in an automotive vehicle. It is arranged in the foot space of the automotive vehicle adjacent the operating pedals of the latter. The servo arrangement comprises two brakets 1 and 2 formed with axially aligned openings therethrough in which sleeve bearings 3 and 4 are respectively mounted. A shaft 5 is rotatably mounted in the aforementioned sleeve bearings 3 and 4 and this shaft has, at an end thereof projecting beyond the sleeve bearing 4 in the bracket 2, a splined portion 6 by means of which the shaft 5 is driven in a known manner from a servomotor, not shown in the drawing. A cylinder 8 is mounted on the shaft 5 between the sleeve bearings 3 and 4 and the cylinder 8 is connected by a pin 7, extending transverse to the axis of the shaft 5, to the latter for rotation therewith. A friction lining 9 is fixed to the outer peripheral surface of the cylinder 8. A coil spring 10 having a plurality of windings and serving as coupling means is wound about the outer surface of the friction lining 9. The inner diameter of the coil spring 10 is dimensioned in such a manner that the coil spring engages the outer peripheral surface of the friction lining 9 with a very small pretension. The coil spring 10 is wound from a flat wire, as can be visualized especially from FIG. 2. The original planar opposite faces of the flat wire are slightly bent during the coiling process so that the inner faces of the coils of the spring are slightly convexly and the outer faces slightly concavely curved. If such a cylindrical coil spring is used, as in the prior art, as expanding coil spring, which at the outer circumference thereof engages the friction lining, then there will result at the edges of the concave surfaces of the coil very high surface pressures. These edges must therefore, at an expanding coil spring, be removed by grinding. By use of the coil spring in accordance with the present invention, in which the inner faces of the coils engage the friction lining, such a grinding operation becomes unnecessary since the concave inner surfaces of the coils properly engage over a major portion thereof the friction lining 9, to thereby reduce the specific contact pressure.

Figure 3A:
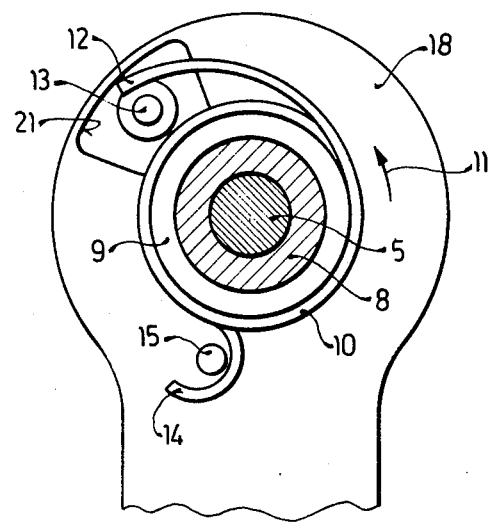
FIG. 3a is a cross-section taken along the line III—III and showing the coil spring coupling in engaged position.
Figure 3B:
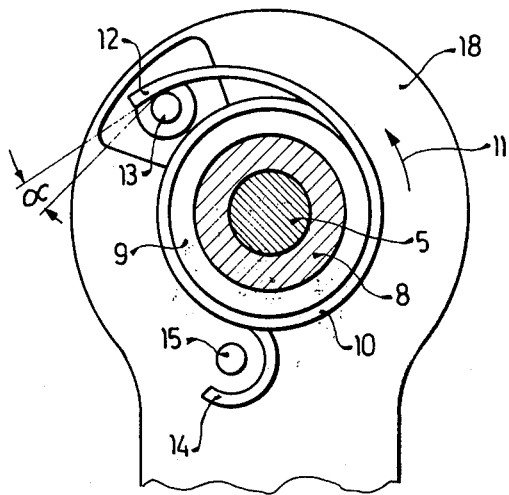
FIG. 3b is a cross-section likewise taken along the line III—III and showing the coil spring coupling in disengaged position.

The front end portion 12 of the coil spring 10, as considered in the direction of rotation of the driven cylinder 8, as indicated by the arrow 11 in FIGS. 3a and 3b, extends about pin-shaped entrainment member 13 which tends, upon engagement with the front end portion 12 of the coil spring, to bend the latter in outward direction. For this purpose, at least the first quarter of the first coil of the coil spring 10 is bent in spiral form radially outwardly, as clearly shown in FIG. 3a. The front end portion 12 of the coil spring 10 is adapted to engage the outer surface portion of the entrainment member 13 which faces away from the turning axis of the cylinder 8. In the disengaged condition, which is illustrated in FIG. 3b, in which the coil spring slides freely on the peripheral surface of the friction lining 9 of the driven cylinder 8, the tangent to the front end portion 12 of the coil spring 10 encloses an acute angle α with the tangent at the point of contact between the coil spring 10 and the entrainment member 13 to the arc of movement of the entrainment member 13. The entrainment member 13 carries out a movement along a circular arc about the axis of the cylinder 8, as will be explained later on. The rear end 14 of the coil spring 10, as considered in the direction of rotation of the driven cylinder 8, is hook-shaped bent and extends about pin-shaped entrainment member 15, which upon engagement with the hook-shaped rear end 14 will apply a tension force to the coil spring 10.

Figure 1:
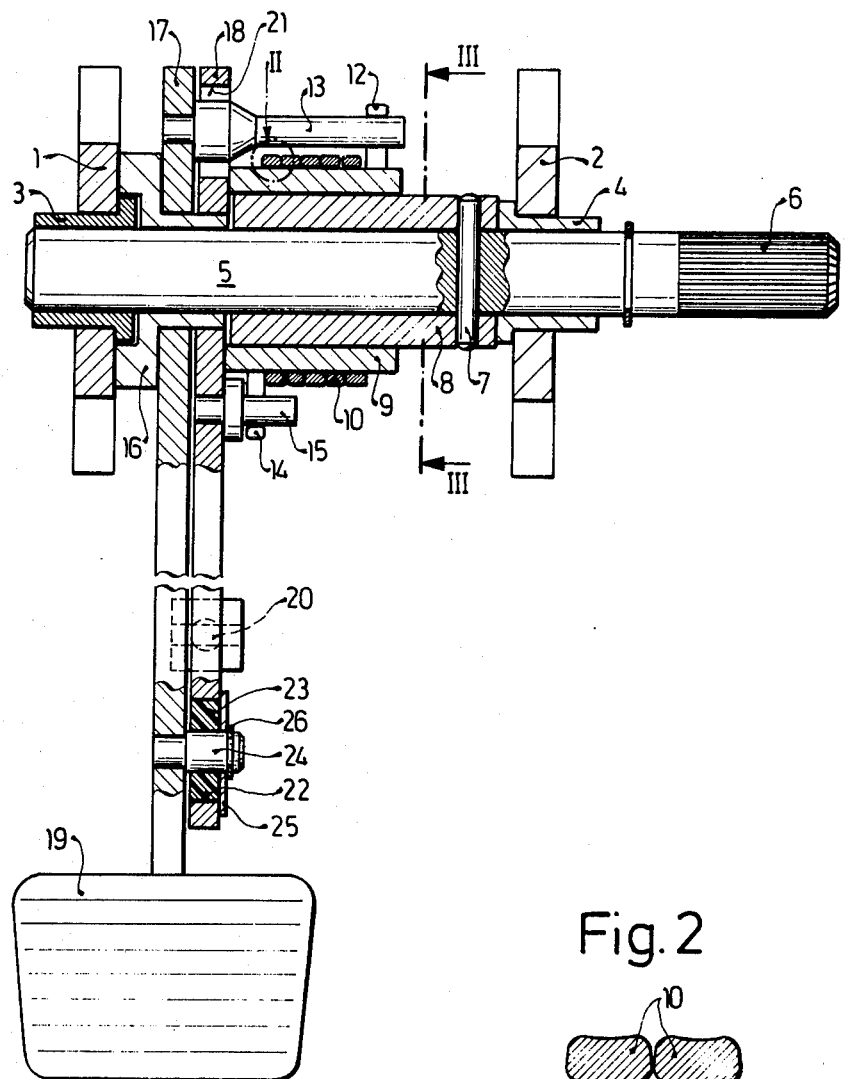
FIG. 1 is a partially sectioned top view of the servo arrangement according to the present invention.

A slide bushing 16 is turnably mounted on the shaft 5 between the bracket 1 and the end face of the cylinder 8 facing away from the bracket 2. The slide bushing 16 abuts with an end face thereof, facing away from the aforementioned end face of the cylinder, the bracket 1. Two levers 17 and 18 are turnably mounted in the region of one end thereof on the slide bushing 16. The lever 17 carries at its other end thereof the brake pedal 19 of the automotive vehicle. A push rod 20 leading to a main braking cylinder, not illustrated in the drawing, is linked to the lever 18. This push rod extends normal to the plane of the drawing of FIG. 1 and it is therefore only in its projection as a circle illustrated in this Figure. The levers 17 and 18 are arranged parallel and closely adjacent to each other. The lever 17 forms therefore a force applying means operable by the foot of the operator and the lever 18 forms the power take-off means of the arrangement. The above-described entrainment member 15, about which the hook-shaped rear end 14 of the coil spring 10 extends, is connected, preferably by riveting, to the lever 18 extending normal thereto. The entrainment member 13, the outer side thereof is adapted to engage the spirally outwardly bent front end portion 12 of the coil spring is, likewise preferably by riveting, connected to the lever 17 extending normal thereto. The lever 18 is formed with an opening 21 through which the entrainment member 13 projects. From the above description of the mounting of the levers 17 and 18 and the entrainment members 13 and 15 respectively connected thereto, it will be evident that the entrainment members 13 and 14, the axes thereof extend parallel to the axis of the shaft 5 will, during movement of the levers 17 and 18, carry out a movement about the axis of the shaft 5 along circular arcs having their centers at the axis of the shaft 5.

The lever 18 is provided in the region of the free end thereof with an opening 22 and a bushing 23 of elastically deformable material, for instance from suitable plastic material, is fixed in the openening 22. The bushing 23 is formed with a central bore therethrough in which a portion of a pin 24 is received which is fixed with the remainder thereof in a corresponding bore formed in the lever 17, extending normal to the longitudinal direction of the latter. A cover disk 25 is connected with play to the free end of the pin 24 which projects beyond the bushing 23 and the cover disk 25 is prevented from falling off the end portion of the pin by a snap ring 26, engaging in a groove of the pin 24.

The above-described servo arrangement will operate as follows:

The shaft 5 is rotated, when the servo arrangement is in its operating phase, in the direction of the arrow 11 (FIGS. 3a and 3b) by the servomotor, not illustrated in the drawing. The coil spring 10 is taken along by the friction lining 9 on the cylinder 8, until the front end 12 runs up on the entrainment member 13. The coil spring 10 is then in the position as shown in FIG. 3b. The coil spring 10 is thereby expanded by means of the force acting on the front end 10 so that the coil spring slides freely on the friction lining 9 of the cylinder 8. Therefore, the coil spring 10, serving as a coupling member, is disengaged and not able to transmit a turning moment. If the driver of the vehicle steps now onto the pedal 19 and transmits thereby a force to the lever 17, then this force will be transmitted by the pin 24 and the elastic bushing 23 to the lever 18. Thereby the elastic bushing will be compressed by an amount depending on the resiliency of the bushing, whereby the annular position of the entrainment member 15 relative to the angular position of the entrainment member 13 will be changed to the position as illustrated in FIG. 3a. In this position the entrainment member 13 becomes disengaged from the front end 12 of the coil spring 10, whereby the latter is taken along by the cylinder in the direction of the arrow 11 until the hook-shaped rear end 14 engages the entrainment member 15. A tension force is now applied to the coil spring 10 which winds the latter tightly about the friction lining 9, fixed to the peripheral surface of the cylinder 8, so that an auxiliary force is applied from the cylinder 8 onto the coil spring 10 and from the latter by means of the hook-shaped rear end onto the entrainment member 15 carried by the lever 18 to which the push rod 20 is connected. If now the driver takes his foot away from the pedal 19, then the entrainment member 13 fixed to the lever 17 will return to the position as illustrated in FIG. 3b, so that the coupling is again released. The disengagement of the coil spring 10 over the inclination formed by the angle α of the front end portion 12 of the coil spring requires a rather large turning angle by the entrainment member 13 in order to traverse the zone of contact of the coupling from the engaged position as shown in FIG. 3a to the position shown in FIG. 3b, in which the inner surface of the coil spring slides freely on the outer surface of the friction lining. Thereby the proportionality desired by the servo arrangement between the braking force and the force exerted by the operator on the foot pedal, is improved.

The elastic bushing 23 is deformed, as above described during operation of the foot pedal 19. The elastic deformation of the bushing 23 determines the size of the angle at which the entrainment member 13, connected to the foot pedal operated lever 17, is moved relative to the entrainment member 15, mounted on the lever 18 to which the push rod 20 is connected, and determines thereby the size of the auxiliary moment which is transmitted to the lever 18. The elastic bushing 23 constitutes therefore a reference member which determines the magnitude of the auxiliary moment introduced to the lever 18. Of course, the reference member may also be constructed in a different manner for instance by a compression spring.

It will be understood that each of the elements described above, or two or more together, may also find a useful application in other types of servo arrangements differing from the types described above.

While the invention has been illustrated and described as embodied in a servo arrangement to be used especially as a brake force amplifier for an automotive vehicle, it is not intended to be limited to the details shown, since various modifications and structural changes may be made without department in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A servo arrangement, especially for brake force amplifiers for automotive vehicles, comprising cylinder means mounted for rotation about its axis and adapted to be driven by a servomotor in one direction about said axis; power take-off means; operator controlled force applying means; elastically deformable means connecting said operator controlled force applying means with said power take-off means; coupling means for transmitting the moment imparted to said cylinder means by the servomotor to said power take-off means, said coupling means comprising a multicoil spring wound about said cylinder means and having a hook-shaped end which, as considered in the direction of rotation of said cylinder means, constitutes a rear end of said coil spring, and an opposite front end portion constituted by at least a first quarter of the first winding of the coil spring which extends in spiral form radially outwardly; and means for rendering said coupling means active and inactive in dependence on the elastic deformation of said deformable connecting means and comprising a first entrainment member connected to said power take-off means and adapted to engage said hook-shaped rear end of said coil spring, upon actuation of said force applying means to apply a tension force to the latter to tightly engage the peripheral surface of said rotating cylinder means, and a second entrainment member connected to said operator controlled force applying means and adapted to engage said front end portion of said coil spring, when said force applying means is not actuated, tending thereby to bend the latter outwardly so that the coil spring may slip on the peripheral surface of said cylinder means.

2. A servo arrangement as defined in claim 1, wherein said coil spring is wound about the cylinder means to engage the peripheral surface of the latter with a slight pretension.

3. A servo arrangement as defined in claim 1, wherein said front end portion of the coil spring is adapted to be engaged by the side of said second entrainment member which faces away from the axis of said cylinder means.

4. A servo arrangement as defined in claim 3, wherein said second entrainment member is movable along a circular arc about the axis of said cylinder means, and wherein upon engagement of said second entrainment member with said front end portion of said coil spring a tangent to said front end portion includes, with a tangent to said circular arc at the point of contact of said second entrainment member with said front end portion, an acute angle.

5. A servo arrangement as defined in claim 1, wherein said power take-off means and said operator controlled force applying means comprise two levers, each mounted in the region of one end thereof turnable about the axis of said cylinder means and respectively carrying said first and second entrainment members extending parallel to the axis of said cylinder means.

6. A servo arrangement as defined in claim 5, wherein said first and said second entrainment members are constituted by pins, each riveted at one end thereof to the respective lever.

7. A servo arrangement as defined in claim 5, wherein said levers are arranged parallel and closely adjacent to each other and wherein one of said levers is provided with an opening through which the entrainment member on the other lever projects.

8. A servo arrangement as defined in claim 7, wherein said elastically deformable connecting means comprises a bushing of elastically deformable plastic material fixed in an opening in one of said levers and being provided with a central bore therethrough and a rigid pin received in said bore and fixed to the other of said levers.

9. A servo arrangement as defined in claim 1, wherein said cylinder means comprises an inner cylinder and a friction lining applied to the peripheral surface of said inner cylinder.

10. A servo arrangement as defined in claim 1, wherein said coil spring is constituted by a flat wire wound into a cylindrical coil.

11. A servo arrangement as defined in claim 5, and including mounting means comprising a pair of brackets mounting said cylinder means for rotation about its axis.

12. A servo arrangement as defined in claim 11, and including a shaft adapted to be driven by the servo motor means, said shaft extending coaxially through said cylinder means, means connecting said cylinder means to said shaft for rotation therewith, a pair of bearing means extending through bores in said brackets and mounting said shaft for rotation about its axis, a slide bushing mounted on said shaft and having opposite end faces respectively engaging one of said brackets and one end face of said cylinder means, said levers being turnably mounted on said slide bushing, and the other end face of said cylinder means engaging the bearing means mounted in the other of said pair of brackets.

13. A servo arrangement as defined in claim 12, wherein said bearing means are constituted by sleeve bearings.

14. A servo arrangement as defined in claim 12, wherein said operator controlled force applying means comprises a foot pedal fixed to a free end of the lever carrying said second entrainment member in the region of the other end thereof, and wherein said power take-off means includes a push rod connected at one end to the other lever between the entrainment member carried by the other lever and said connecting means, the other end of said push rod being adapted to be connected to a brake cylinder of the automotive vehicle.

* * * * *